United States Patent
Korn et al.

(10) Patent No.: US 10,038,654 B1
(45) Date of Patent: Jul. 31, 2018

(54) DYNAMIC FORMATTING OF MESSAGES FOR MULTIPLE ENDPOINTS

(71) Applicant: Google Inc., Mountain View, CA (US)

(72) Inventors: Jeffrey Lawrence Korn, New York, NY (US); Kurt Alfred Kluever, Hoboken, NJ (US); Stephen Concannon, Cranford, NJ (US); Jonathan Kennell, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/671,068

(22) Filed: Aug. 7, 2017

Related U.S. Application Data (63) Continuation of application No. 14/628,171, filed on Feb. 20, 2015, now Pat. No. 9,729,481, which is a continuation of application No. 13/174,112, filed on Jun. 30, 2011, now Pat. No. 8,990,321.

(51) Int. Cl.
*H04L 29/08* (2006.01)
*H04L 12/58* (2006.01)

(52) U.S. Cl.
CPC .................. *H04L 51/066* (2013.01)

(58) Field of Classification Search
None
See application file for complete search history.

(56) References Cited

U.S. PATENT DOCUMENTS

| | | | |
|---|---|---|---|
| 2005/0198166 A1* | 9/2005 | Kawaji | G06Q 10/107 709/206 |
| 2007/0124689 A1* | 5/2007 | Weksel | H04M 3/53366 715/752 |
| 2008/0263169 A1* | 10/2008 | Brabec | H04L 29/06 709/206 |
| 2009/0144357 A1* | 6/2009 | Cope | G06F 9/546 709/202 |
| 2009/0177484 A1* | 7/2009 | Davis | G06Q 30/02 705/346 |
| 2011/0135071 A1* | 6/2011 | Milstein | G06F 17/2872 379/88.14 |
| 2011/0282949 A1* | 11/2011 | Rivkin | G06F 9/541 709/206 |

* cited by examiner

*Primary Examiner* — Natisha D Cox
(74) *Attorney, Agent, or Firm* — McDermott Will & Emery LLP (57) ABSTRACT

In one general aspect, a tangible computer-readable storage medium can be configured to store instructions that when executed cause a processor to perform a process. The instructions can include instructions to receive an indicator that at least a portion of a source message has been produced using a source module, and instructions to send to the source module, in response to the indicator, an extraction module configured to assign an attribute value to content of the source message. The attribute value can represent a contextual function of the content within the source message. The instructions can include instructions to receive a content package including the content and the attribute value assigned to the content, and produce a plurality of endpoint-specific messages associated with a plurality of endpoints based on a plurality of message templates and the attribute value assigned to the content within the content package.

20 Claims, 7 Drawing Sheets

| Rule 310 | Endpoints 320 | Message Customization 330 |
|---|---|---|
| R1 | UV1 | MC1 |
| | UV2 | |
| | UV3 | |
| | UV4 | |
| | UV5 | MC2 |
| | UV6 | MC3 |
| R2 | UV1 | MC4 |
| | UV2 | |
| | UV3 | |
| | UV4 | |

DYNAMIC FORMATTING OF MESSAGES FOR MULTIPLE ENDPOINTS

CROSS-REFERENCE TO RELATED APPLICATIONS

The present application is a continuation of U.S. patent application Ser. No. 14/628,171, entitled "DYNAMIC FORMATTING OF MESSAGES FOR MULTIPLE ENDPOINTS," filed Feb. 20, 2015, which is a continuation application of U.S. patent application Ser. No. 13/174,112 entitled "DYNAMIC FORMATTING OF MESSAGES FOR MULTIPLE ENDPOINTS," filed on Jun. 30, 2011, now issued as U.S. Pat. No. 8,990,321, the disclosures of which are hereby incorporated by reference in their entirety for all purposes.

TECHNICAL FIELD

This description relates to formatting of messages for multiple endpoints.

BACKGROUND

Known applications such as e-mail applications, text messaging applications, and so forth, are configured to generate and send messages (e.g., communications, updates, announcements) from a user (e.g., a user account) or to a user (e.g., a user account). In some instances, these messages can be notifications automatically generated by one or more applications in response to, for example, a change (e.g., a system change, an administrative change, a file change) associated with the application. These applications are often limited to sending messages to or from a user using a specific communication format such as an e-mail message or a text message. The user, however, may wish to send messages to several different devices of another user and/or receive messages at several different devices using different formats, but these known applications may not have the capability and/or processing resources to appropriately format the message for each of the several different devices. Thus, a need exists for systems, methods, and apparatus to address the shortfalls of present technology and to provide other new and innovative features.

SUMMARY

In one general aspect, a tangible computer-readable storage medium can be configured to store instructions that when executed cause a processor to perform a process. The instructions can include instructions to receive an indicator that at least a portion of a source message has been produced using a source module, and instructions to send to the source module, in response to the indicator, an extraction module configured to assign an attribute value to content of the source message. The attribute value can represent a contextual function of the content within the source message. The instructions can include instructions to receive a content package including the content and the attribute value assigned to the content, and produce a plurality of endpoint-specific messages associated with a plurality of endpoints based on a plurality of message templates and the attribute value assigned to the content within the content package.

In another general aspect, a method can include receiving a message template defining a format based on a first plurality of attribute values, and receiving a content package including content associated with a second plurality of attribute values where the content is from a source message produced at a source module. The method can include defining an endpoint-specific message for an endpoint based on an intersection between the first plurality of attribute values associated with the message template and the second plurality of attribute values associated with the content.

In yet another general aspect, a tangible computer-readable storage medium can be configured to store instructions that when executed cause a processor to perform a process. The instructions can include instructions to select a message template from a plurality of message templates based on an endpoint targeted for receipt of an endpoint-specific message, and receive a content package including a plurality of content portions parsed from a source message produced at a source module. Each content portion from the plurality of content portions can be associated with at least one attribute value from a plurality of attribute values. The instructions can include instructions to define the endpoint-specific message based on at least a portion of the plurality of attribute values being included in the message template.

The details of one or more implementations are set forth in the accompanying drawings and the description below. Other features will be apparent from the description and drawings, and from the claims.

DETAILED DESCRIPTION

Figure 1:
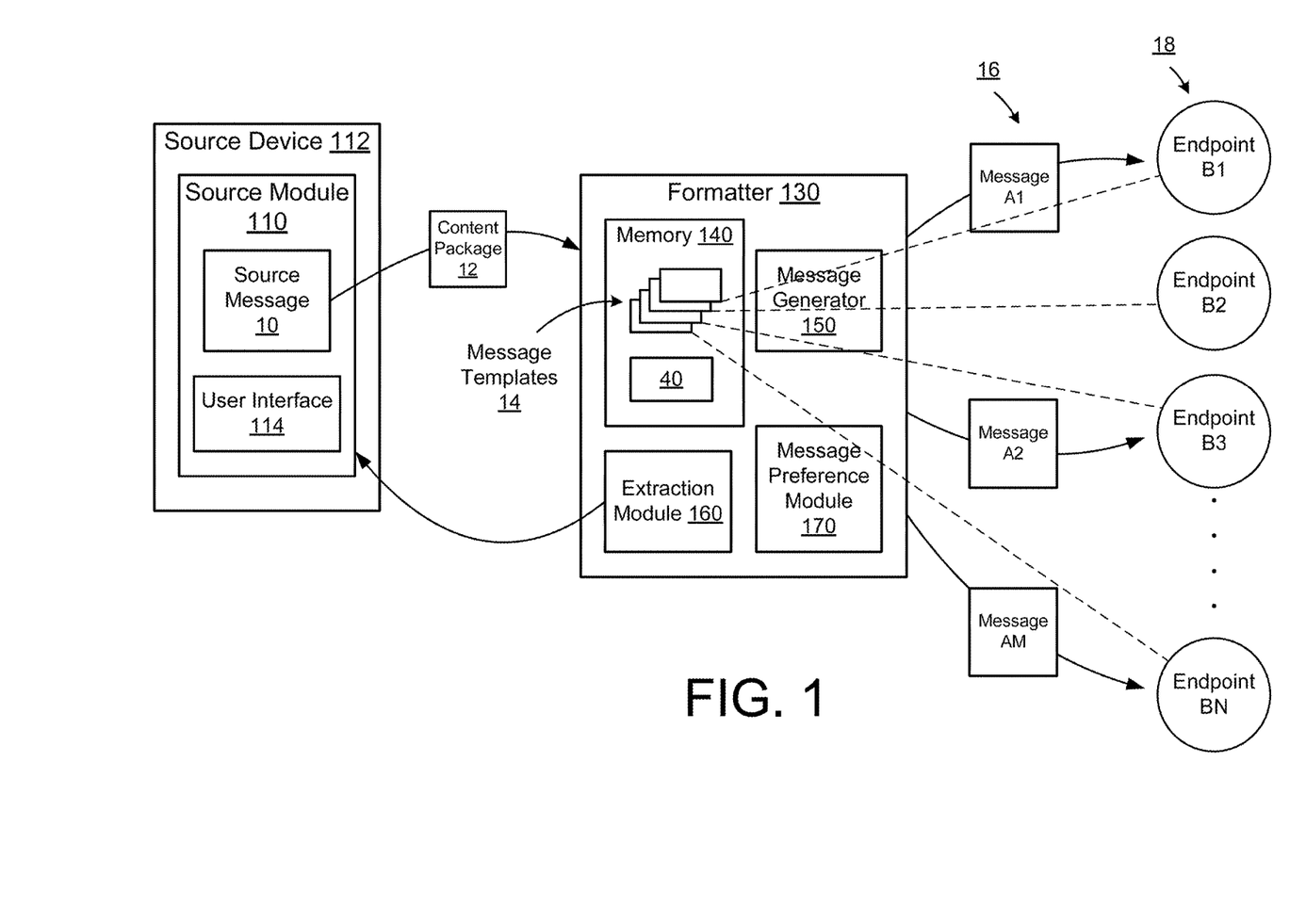
FIG. 1 is a diagram that illustrates a formatter configured to define endpoint-specific messages for endpoints, according to an implementation.

FIG. 1 is a diagram that illustrates a formatter 130 configured to define endpoint-specific messages 16 for endpoints 18, according to an implementation. The formatter 130 is configured to define the endpoint-specific messages 16, which include messages A1 through AM, based on a source message 10 (e.g., a text message, an e-mail message, a notification produced by an application) defined at a source module 110 of a source device 112. The endpoints 18, which include endpoint B1 through BN, and/or the source device 112 can each be, for example, a wired device and/or a wireless device such as a mobile phone, a smartphone, a personal digital assistant (PDA), a personal computer, a tablet computer, and/or so forth, that can operate based on a variety of platforms. In some implementations, the endpoints 18 and/or the source module 110 can be, or can include, for example, an application (e.g., a text messaging application, an e-mail application, a web application, a chat application, a social media application), or a portion thereof.

As shown in FIG. 1, the formatter 130 can be used to define and send (e.g., distribute) multiple endpoint-specific messages 16 based on a single source message 10. Each of the endpoint-specific messages 16 can have a format (e.g., arrangement) that is defined at the formatter 130 (e.g., the message generator 150 of the formatter 130) specifically for the endpoint 18 receiving the message. Each of the endpoints 18 can be different endpoint types (e.g., a smartphone endpoint type, a particular messaging program or social media application functioning as an endpoint) with different processing capabilities configured to process different (e.g., mutually exclusive, incompatible) message formats. For example, the message A1 can be defined at the message generator 150 based on at least a portion of the content (e.g., textual content, image content, audio content) included in the source message 10 with a first format that can be processed by the endpoint B1, and the message A2 can be defined at the message generator 150 based on at least a portion of the content (also can be referred to as a content portion) included in the source message 10 with a second format that can be processed by the endpoint B3. Endpoint B1 may not be configured to process messages (e.g., message A2) based on the second format, and similarly, endpoint B3 may not be configured to process messages (e.g., message A1) based on the first format. A format for one or more of the endpoints 18, which can be different endpoint types, can be referred to as an endpoint-specific format.

The formatter 130 includes a message generator 150 configured to define each of the endpoint-specific messages 16 with the endpoint-specific format based on a combination of a content package 12 received from the source module 110 and one or more message templates 14 stored in a memory 140. The message templates 14 are templates that can be used by the message generator 150 of the formatter 130 to define a message with an endpoint-specific format. In FIG. 1, the relationships between the message templates and the endpoints 18 are illustrated by dashed lines between the message templates 14 and the endpoints 18. For example, one of the message templates 14 associated with endpoint BN (represented by the dashed line) can include data that can be used by the message generator 150 of the formatter 130 to define, for example, message AM with a format specific to endpoint BN.

As shown in FIG. 1, a content package 12 is defined at the source device 112 based on the source message 10. The content package 12 is then used by the message generator 150 of the formatter 130 to define the endpoint-specific messages 16 with the endpoint-specific formats based on the message templates 14. In some implementations, the content package 12 can be, or can include, a parsed version of the source message 10 that can be used in conjunction with (e.g., compatibly with) the message templates 14 to define the endpoint-specific messages 16 with the endpoint-specific formats.

The content package 12 is defined based on the source message 10 using an extraction module 160 (or an instance or copy of the extraction module 160) sent from the message generator 150 of the formatter 130 to the source module 110. The message generator 150 of the formatter 130 is configured to send (or trigger sending of) the extraction module 160 (or instance thereof) to the source module 110 in response to an indicator that the source message 10 is being processed at (e.g., has been defined at, is triggered for sending from) the source module 110.

As a specific example, the source device 112 can be a mobile phone and the source module 110 can be an e-mail application operating at a mobile phone. A user (via a user account) can use the e-mail application to draft an e-mail message (which can be the source message 10) including textual content. The user can choose, via a user interface 114 (e.g., user interface of the application), to send the textual content of the e-mail message to several of the endpoints 18 that are each configured to receive messages based on formats different than the e-mail message format produced at the mobile phone. The user interface 114 can be a user interface of (e.g., user interface that can be used to control) the source module 110. The several endpoints 18 can be selected before or after the e-mail message has been drafted. The content package 12 can include one or more indicators (e.g., addresses) of the several endpoints 18 to which the textual content of the e-mail message should be sent. The extraction module 160 can be configured to parse the textual content of the e-mail message into the content package 12 that can be used by the message generator 150 of the formatter 130 to define the endpoint-specific messages (such as text messages with limited numbers of characters and/or no subject line) based on the message templates 14. The message generator 150 of the formatter 130 is configured to automatically format and send the textual content of the e-mail message to the endpoint-specific messages for each of the several endpoints 18 selected by the user (via a user account) so that the user is not required to separately and manually send the textual content of the e-mail message to each of the several endpoints 18 using, for example, different devices and/or applications. Without the functionality of the formatter 130 the user would be required to manually reformat and send the textual content of the e-mail message to each of the several endpoints 18.

As another specific example, the source module 110 can be an application (e.g., a document sharing application, an application associated with a company or institution (e.g., a web banking application), a social media application, a chat application) operating at a server (e.g., the source device 112). The source message 10 can be a notification (e.g., a change/update notification, a warning message, an announcement) automatically produced (e.g., generated, produced periodically) by the application. A user (e.g., a user account) targeted to receive the notification can choose, via the user interface 114 (e.g., web-based user interface), to have the content of the notification to several of the endpoints 18 (e.g., mobile phone, personal computer) owned by the user (e.g., associated with a user account). The several endpoints 18 can be selected before the notification is produced by the application. The content package 12 can include one or more indicators of the several endpoints 18 to which the content of the notification should be sent. The extraction module 160 can be configured to parse the content of the notification into the content package 12 that can be used by the message generator 150 of the formatter 130 to define the endpoint-specific messages (such as text messages, email messages) based on the message templates 14. The message generator 150 of the formatter 130 is configured to automatically format and send the content of the notification in the endpoint-specific messages for each of the several endpoints 18 selected by the user (via a user account). Without the functionality of the formatter 130 the application would not be able to reformat and send the content of the notification to each of the several endpoints 18.

The content package 12 can be defined (using the extraction module 160) so that the content of the source message 10 can be efficiently used with each of the message templates 14 to define the endpoint-specific messages 16. The content of the source message 10 can be parsed and included in the content package 12 so that content can be formatted for each of the endpoint-specific messages 16 using the message templates 14. For example, portions of the source message 10 can be categorized (e.g., labeled, categorized in standardized fashion) so that the portions of the source message 10 can be incorporated into the message templates 14 based on the categorizations to define the endpoint-specific messages 16. Thus, the content package 12, which is defined once based on the source message 10, can be used multiple times based on the message templates 14 to produce the multiple endpoint-specific messages 16 for distribution.

Specifically, the content package 12 can include content parsed from the source message 10 and assigned (e.g., categorized with) attribute values (which can function as labels, categories, or characterizations) that can be used by the message generator 150 of the formatter 130 to define one or more of the endpoint-specific messages 16 based on the message templates 14. For example, the source message 10 can have a portion that is a subject line that can be assigned (e.g., tagged with) an attribute value (within the content package 12) indicating that the portion of the message is a subject line. The formatter 130 can be configured to identify the portion of the source message 10 based on the assignment of the attribute value to the portion of the source message 10 so that the portion of the source message 10 can be appropriately included in one or more of the endpoint-specific messages 16 by the message generator 150 of the formatter 130 based on the message templates 14. Thus, the attribute value characterizes the content as a part of the source message 10 that can be transferred into (e.g., included in) the endpoint-specific messages 16 (using the message templates 14).

In some implementations, the attribute value can identify a contextual function of content portions of the source message 10 so that the content portions can be included with the appropriate context within the endpoint-specific messages 16 (using the message templates 14). In other words, the attribute value can be assigned to a portion of the source message 10 based on the contextual function of the portion within the source message 10 as, for example, a subject, a salutation, a greeting, a body portion of the source message 10, an address portion, and/or so forth.

Figure 2:
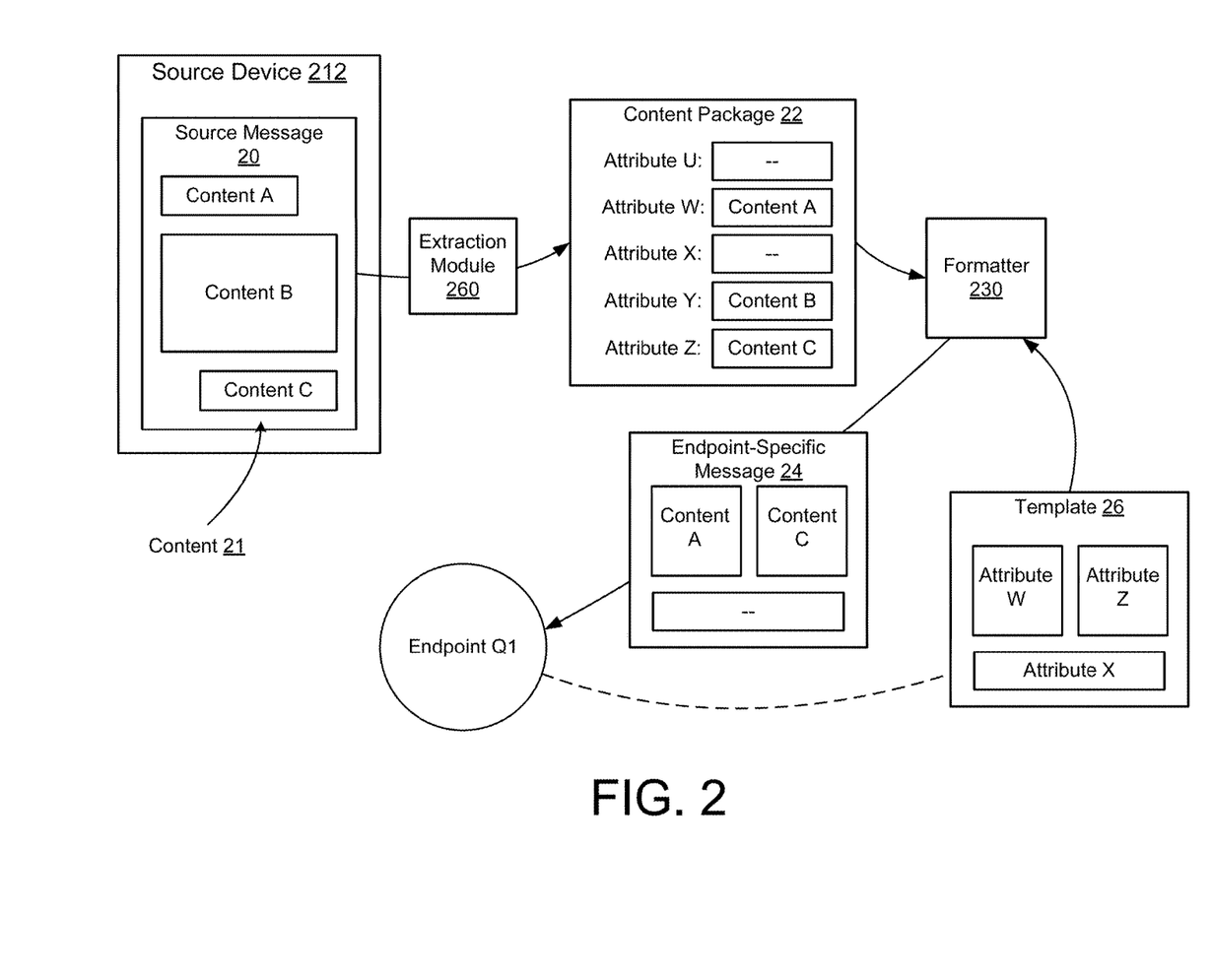
FIG. 2 is a block diagram that illustrates parsing of content of a source message into an endpoint-specific message for an endpoint, according to an implementation.

FIG. 2 is a block diagram that illustrates parsing of content of a source message 20 so that the content 21 can be included in an endpoint-specific message 24 for an endpoint Q1. As shown in FIG. 2, the source message 20, which is defined at a source device 212 (by a user), includes content A, content B, and content C (collectively referred to as content 21). An extraction module 260 (similar to the extraction module 160 shown in FIG. 1) is configured to parse the content 21 of the source message 20 and assign attribute values to the portions of content 21 (also can be referred to as a content portions) included in the source message 20.

As shown in FIG. 2, content A is assigned attribute value W, content B is assigned attribute value Y, and content C is assigned attribute value Z by the extraction module 260. In some implementations, the attribute values (also can be referred to as message metadata) can be used to identify or characterize the content 21. In some implementations, the attribute values can identify contextual functions of content 21 of the source message 20. For example, an attribute value can identify and/or characterize at least a portion of the content 21 as a subject, a body portion, an image (or collection of images such as a video), an audio recording, a signature block (e.g., a salutation), an advertisement, a link (e.g., a hyperlink), an attachment, a destination (e.g., a destination e-mail address, a destination phone number, an endpoint type, a destination Internet protocol (IP) address), a source (e.g., a reply address, a source e-mail address, a source phone number, a source IP address) a priority (e.g., an urgent priority, a low priority), creation data (e.g., a creation date timestamp), a header, and/or so forth.

In some implementations, the extraction module 260 can be configured to analyze various source message formats, such as the format of source message 20, so that attribute values can be appropriately assigned to content of the source messages. In some implementations, the extraction module 260 can include, for example, natural language processing functionality, optical character recognition processing functionality, and/or so forth, that can be used to analyze portions of the content and determine which attribute value should be assigned to the portions of the content. For example, in some implementations, a portion of content of a source message can be identified by (and assigned with an appropriate attribute value by) the extraction module 260 as a subject of the content based on a structure of the portion of the content of the source message and/or specific words/phrases (e.g., "re:") included in the portion of the content. As another example, a portion of a source message can be identified by (and assigned with an appropriate attribute value by) the extraction module 260 as a salutation portion or as a greeting portion of the source message based on words (e.g., "hi", "sincerely", "dear", etc.) and/or punctuation of the portion of the source message. As another specific example, a portion of content of a source message can be identified by (and assigned with an appropriate attribute value by) the extraction module 260 as a body portion based on the placement of the portion of the content with respect to other portions of the source message.

As shown in FIG. 2, the content is associated with (e.g., assigned) attribute values in a content package 22 by the extraction module 260. In this implementation, certain attribute values (i.e., attribute value U, attribute value X) are not assigned to portions of the content 21 of the source message 20 because content corresponding with these attribute values do not exist within the source message 20. The attribute values that are not assigned to portions of the content 21 are shown as null values as represented by "- -". In some implementations, multiple attribute values can be assigned to a portion of the content 21, and in some implementations, multiple portions of the content 21 can be assigned to a single attribute value. For example, an attribute value can be used to identify a subject of a message, a source device, a destination device, an endpoint type (which can be determined based on the destination device), a body of a message, and/or so forth.

In some implementations, the content package 22 can be based on a variety of programming languages (e.g., C++ programming language, HTML, XML). For example, the content package 22 can be an XML-based content package. In such implementations, the attribute values can be associated with (or can be) XML tags. The content package 22 can be defined using it any type programming language that can be processed by the formatter 230 to extract the content and/or the attribute values assigned to the content. In some implementations, the content package 22 can be compiled and/or can be a stand-alone executable program.

As shown in FIG. 2, after the content package 22 has been defined, the content package 22 is received at the formatter 230. The formatter 230 (e.g., the message generator 150 of the formatter 230) is configured to process the content package 22 and define an endpoint-specific message 24 based on a template 26. The template 26 is associated with a format specifically defined for endpoint Q1 (the relationship is represented by the dashed line). Thus, the template 26 can be arranged so that content having a particular contextual function can be appropriately included in the endpoint-specific message 24 based on the template 26.

As shown in FIG. 2, the template 26 includes several attribute values (i.e., attribute value W, attribute value Z, and attribute value X). The portions of the content 21 that are associated with the attribute values in the template 26 can be extracted from the content package 22 so that the portions of the content 21 can be included in the endpoint-specific message 24 for the endpoint Q1.

As a specific example, attribute value Z is included in the template 26, and the attribute value Z is associated with content C in the content package 22. Accordingly, the formatter 230 can be configured to insert content C into the endpoint-specific message 24 based on the association of the attribute value Z with the content C in content package 22. As another specific example, attribute value W is included in the template 26, and the attribute value W is associated with content A in the content package 22. Accordingly, the formatter 230 can be configured to insert content A into the endpoint-specific message 24 based on the association of the attribute value Z with the content A in content package 22.

As shown in FIG. 2, the template 26 includes an attribute value X. In this implementation, the content package 22 includes a null value for the attribute value X. In other words, the content 21 of the source message 20 does not include content associated with attribute value X. Accordingly, the endpoint-specific message 24 does not include content in a portion of the endpoint-specific message 24 allocated for content associated with attribute value X. Thus, the endpoint-specific message 24 is defined based on an intersection between the attribute values in the content package 22 (and associated with the parsed content) and the attribute values included in the template 26.

In some implementations, the template 26 can define (or can include) a protocol requirement, a file size, encoding requirements, encryption requirements, a programming language, a packet (e.g., data packet) structure, and/or so forth that can be used to define the endpoint-specific message 24 so that the endpoint-specific message 24 can be compatibly processed by endpoint Q1. In some implementations, the specifications (e.g., limitations, requirements) of the template 26 can be included in one or more instructions (not shown) (e.g., metadata) associated with the template 26. For example, in some implementations, the template 26 can define placement of content (e.g., placement of content at a specified location, orientation of content) that can be processed by the endpoint Q1. In some implementations, a template 26 can define a container (e.g., a widget, an XML container) and/or fields into which the portions of content 21 from the source message 20 can be populated based on the attribute values assigned to the portions of the content 21 in the content package 22. In some implementations, the template 26 can be defined using a template program such as, for example, Clearsilver.

In some implementations, the template 26 can include instructions that can be used to modify the content appropriately for the endpoint-specific message 24 for a particular endpoint type. For example, the endpoint-specific message 24 can be a short message service (SMS) message that only allows for a certain number of characters for attribute value W. The template 26 can include instructions (not shown) specifying that content associated with attribute value W should not exceed the character limit. The instructions can specify a manner in which the content should be truncated (or divided into multiple messages), if necessary. Accordingly, if content A includes more characters than allowed for in the SMS message for attribute value W, content A can be truncated (or divided into multiple messages) for inclusion in the endpoint-specific message 24.

In this implementation, the locations of the content 21, when included in the endpoint-specific message 24, correspond with the locations of the attribute values shown in template 26. In some implementations, the locations of the content when included in a message may not correspond with the locations of the attribute values as included within a template.

After the endpoint-specific message 24 has been defined by the formatter 230 based on the template 26, the formatter 230 is configured to send an endpoint-specific message 24 to the endpoint Q1. Endpoint Q1 is configured to receive the endpoint-specific message 24 and process the endpoint-specific message 24 based on the format defined by the template 26.

Although not shown in FIG. 2, the formatter 230 can be configured to process the content package 22 based on additional templates (e.g., templates in addition to template 26) so that multiple messages (in addition to endpoint-specific message 24) can be defined for several endpoints. In other words, the formatter 230 can be configured to process the content package 22 to define multiple messages with endpoint-specific formats based on the single source message 20. In such implementations, the assignment of the attribute values to portions of the content 21 can be used to include the portions of the content 21 in message templates (such as message template 26) that can be used to define multiple endpoint-specific messages (not shown).

In some implementations, multiple templates can be associated with the endpoint Q1 in addition to message template 26. In such implementations, one or more of the message templates can be selected to define a message for the endpoint Q1 based on the content 21 included in the content package 22. For example, a message template that does not include attribute value X (which has a null value in content package 22), but includes content associated with attribute value Y (which is associated with content in content package 22, but is not included in message template 26) can be selected to define a message for endpoint Q1. Accordingly, all of the content (e.g., content A through C) included in the source message 20 can be included in an endpoint-specific message for endpoint Q1.

Referring back to FIG. 1, the extraction module 160 (or an instance thereof) can be sent to the source module 110 (or multiple source modules (not shown)) as an executable (e.g., a widget, a Java program, a compiled executable or set of instructions) that can be received at the source module 110 in response to the source message 10 being processed (e.g., drafted, finalized for sending, prepared for sending). Accordingly, the source module 110 may not include the functionality of the extraction module 160 until the functionality of the extraction module 160 is needed to process the source message 10 so that a content package 12 can be defined. In such implementations, the extraction module 160 can be updated and/or modified without modifying the source module 110. Thus, multiple source modules (not shown), such as the source module 110, can use updated functionality of the extraction module 160 on an on-demand basis. Although not shown in FIG. 1, in some implementations, the functionality of the extraction module 160 can be integrated into the source module 110.

In some implementations, the extraction module 160 can be served into the user interface 114. In some implementations, when a link to the extraction module 160 within the user interface 114 is accessed, the extraction module 160 can be served into user interface 114. In such implementations, modifications (e.g., updates), if any, to the extraction module 160 can be served into the user interface 114.

In some implementations, the message templates 14 shown in FIG. 1 may not be stored locally in the memory 140 of the formatter 130. Instead, one or more of the message templates 14 can be stored in a database that can be accessed by the formatter 130. In some implementations, one or more of the endpoints 18 can be configured to send one or more message templates to the formatter 130 on an on-demand basis.

In some implementations, the message generator 150 of the formatter 130 can be configured to request a message template from one or more of the endpoints 18 (or a user account associated with the endpoint(s) 18). For example, the content package 12 can include an indicator that content from the source message 10 is to be sent to an additional endpoint not included in the endpoints 18. If a message template associated with the additional endpoint is not stored in the memory 140 of the formatter 130 (or may not be otherwise access in a database associated with the formatter 130), the message generator 150 of the formatter 130 can be configured to request a message template from the additional endpoint so that an endpoint-specific message can be defined for the endpoint. In other words, a message template can be requested for a particular endpoint targeted for an endpoint-specific message and for which a message template is not available.

In some implementations, one or more of the message templates 14 can be selected to define one or more of the endpoint-specific messages 16 based on an endpoint type. For example, a message template from the message templates 14 can be used to define an endpoint-specific message 16 associated with a smartphone endpoint type. Accordingly, if one of the endpoints 18 is identified as a smartphone endpoint type, the message template 14 associated with the smartphone endpoint type can be used to define an endpoint-specific message for the smartphone endpoint type.

As shown in FIG. 1, a message preference 40 is stored in the memory 140. The message preference 40 can include preferences related to sending of the messages 16 to the endpoints 18 based on the source message 10. For example, the message preference 40 can be associated with a user (e.g., a user account) and can be configured to automatically trigger sending of one or more messages (such as the endpoint-specific messages 16) to one or more of the endpoints 18 in response to a source message (such as source message 10) being defined at the source device 112 by the user. In other words, the message generator 150 of the formatter 130 can be configured to automatically send messages to a predefined subset of the endpoints 18 based on the message preference 40 associated with a user (e.g., a user account). The message preference 40 can indicate at least a portion of the endpoints 18 that are targeted to receive one or more endpoint-specific messages (such as endpoint-specific messages 16). In some implementations, the message preference 40 can be analyzed by the message preference module 170 so that the endpoint-specific messages 16 can be defined by the message generator 150 based on message preference 40.

As a specific example, a first user (via a user account) can produce a shared document using a document program (such as Google docs). The document program can be configured to send an update notification (e.g., a source message 10) to a first user in response to the shared document being updated by a second user (with authorization to update the shared document via a user account of the second user). The first user can define a message preference (e.g., message preference 40) that can be used by the message generator 150 of the formatter 130 to send multiple endpoint-specific notifications (e.g., endpoint-specific message 16) based on the update notification (e.g., source message 10) to multiple endpoint devices (e.g., endpoints 18) owned by the first user (e.g., associated with a user account of the first user). Instead of sending the update notification only once directly to an endpoint of the first user, the document program can be configured to parse the content of the update notification into a content package (e.g., content package 12) using an extraction module (e.g., extraction module 160). The message generator 150 of the formatter 130 can be configured to receive the content package and define a set of endpoint-specific messages with the content of the update notification based on the multiple endpoint devices specified within the message preference by the first user. Accordingly, the first user can be notified of the change to the document at multiple endpoint devices owned by the first user.

Although not shown in FIG. 1, in some implementations, message preference 40 can be stored at the source device 112. In such implementations, the message preference (or portions thereof) can optionally be included in the content package 12 that is sent to the formatter 130. In some implementations, the user interface 114 of the source module 110 can be used to define the message preference 40 and/or to modify the message preference 40.

Figure 3:
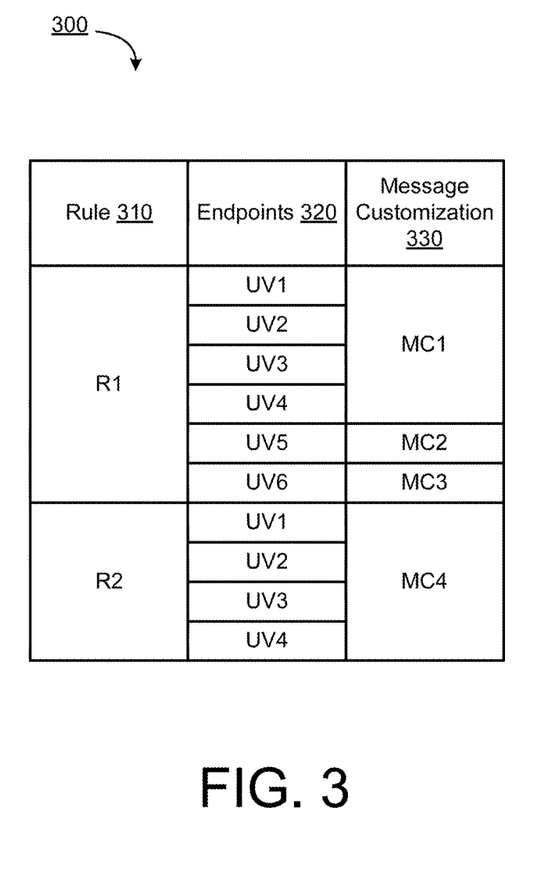
FIG. 3 is a diagram that illustrates a message preference, according to an implementation.

FIG. 3 is a diagram that illustrates a message preference 300, according to an implementation. In some implementations, message preference 300 can be stored in, or included in, a table and/or can define at least a portion of a database associated with a formatter (such as formatter 130 shown in FIG. 1). As shown in FIG. 3, the message preference 300 includes rule R1 and rule R2 (shown in column 310), endpoints UV1 through UV6 (shown in column 320), and message customizations MC1 through MC4 (shown in column 330). In this implementation, endpoint-specific messages can be sent to each of the endpoints UV1 through UV6 (shown in column 320) in response to the rule R1 (shown in column 330) being satisfied. Similarly, endpoint-specific messages can be sent to each of the endpoints UV1 through UV4 (shown in column 320) in response to the rule R2 (shown in column 330) being satisfied.

In some implementations, the rules 310 can be rules configured to trigger sending of endpoint-specific messages in response to, for example, a shared document being updated, a message being sent from a particular program (e.g., source module 110 shown in FIG. 1) or user (e.g., a user account), a message being sent to a specified destination and/or forwarded from a specified source, and/or so forth. Although not shown in FIG. 3, the message templates (or compatible message templates) associated with each of the endpoints 330 can be specified within the message preference 300.

The message customizations 330 can include any type of customization related to endpoint-specific messages. For example, message customization MC2 (shown in column 330) can indicate that an endpoint-specific message sent to endpoint UV5 (shown in column 320) should only be sent during a specified time of day or should be delayed for a specified time period (e.g., during working hours, during daytime hours). In some implementations, one or more of the message customizations 330 can include authentication information (e.g., an authentication token), username and/or password information, and/or so forth, that can enable access to one or more of the endpoints 320. In some embodiments, one or more of the message customizations 330 can be included in, for example, a message template.

Referring back to FIG. 1, in some implementations, the formatter 130 can be configured to operate at a host device. In such implementations, the formatter 130 can be accessed through a network by the source device 112, which can function as a client to the host device. In some implementations, the formatter 130 can function as an intermediate application between the source device 112 (and/or additional source devices) and the endpoints 18. Accordingly, the functionality of the formatter 130 can be called and/or executed on an on-demand basis (e.g., in response to the source message 10 being defined, in response to the functionality of the formatter 130 being triggered via the user interface 114). In some implementations, the formatter 130 can function as a background application operating in conjunction with the source device 112 (and/or additional source devices) and/or the endpoints 18. In some embodiments, the formatter 130 can function as an application (or service) that can be accessed via an application programming interface (API).

The formatter 130 can be, or can include, any type of hardware and/or software configured to facilitate users (e.g., user accounts) of the formatter 130 to distribute the content of the source message 10 to one or more of the endpoints 18. In some implementations, one or more portions of the components shown in the formatter 130 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the formatter 130 can be, or can include, a software module configured for execution by at least one processor (not shown). In some implementations, the functionality of the components can be included in different modules and/or components than those shown in FIG. 1. For example, although not shown, the functionality of the message generator 150 of the formatter 130 can be included in a different module than the message generator 150 the formatter 130, or divided into several different modules.

Although not shown, in some implementations the formatter 130 (or portions thereof), the source device 112 (or portions thereof), and/or the endpoints 18 (or portions thereof) can be configured to operate within, for example, a data center (e.g., a cloud computing environment), a computer system, one or more server/host devices, and/or so forth. In some implementations, the formatter 130 (or portions thereof), the source device 112 (or portions thereof), and/or the endpoints 18 (or portions thereof) can be configured to operate within a network. Thus, the formatter 130, the source device 112, and/or the endpoints 18 (or portions thereof) can be configured to function within various types of network environments that can include one or more client devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, the formatter 130 can be included in, or can be associated with, a social media application (not shown). In such instances, one or more messages defined within the social media application for a user (e.g., defined by an individual within a social network for the user), can be distributed to one or more endpoints of the user via the formatter 130. The social media application can be any type of application that can be used by a user to share content and/or other information with a network of users (e.g., friends, relatives, colleagues, business associates) associated with the user. In some implementations, the social media application can be a web-based application that can be accessed by users. In some implementations, the social media application can be referred to as a social media system and can be part of a social media platform. In some implementations, the social media application can be associated with a social network service. In some implementations, the social media application can be a collaborative environment through which one or more users (such as a sharer and/or a consumer of content) can engage in collaborative work. In some implementations, the social media application can include one or more search engines, social network services, forums, instant messaging/chat applications, virtual environments, peer-to-peer communications applications, and/or so forth. In some implementations, the social media application can include, or can be based on, one or more open application programming interfaces (APIs).

The formatter 130 can be configured to operate based on one or more platforms (e.g., one or more similar or different platforms) that can include one or more types of hardware, software, firmware, operating systems, runtime libraries, and/or so forth. In some implementations, the formatter 130 can represent a cluster of devices (e.g., a server farm). In such an implementation, the functionality and processing of the formatter 130 can be distributed to several devices of the cluster of devices.

Although not shown, in some implementations, the memory 140 can be implemented as more than one memory component (e.g., more than one random-access memory (RAM) component or disk drive memory) associated with the formatter 130. In some implementations, the memory 140 can be a database memory. In some implementations, the memory 140 can be, or can include, a non-local memory. For example, the memory 140 can be, or can include, a memory shared by multiple devices (not shown). In some implementations, the memory 140 can be associated with a server device (not shown) within a network and configured to serve the formatter 130.

Figure 4:
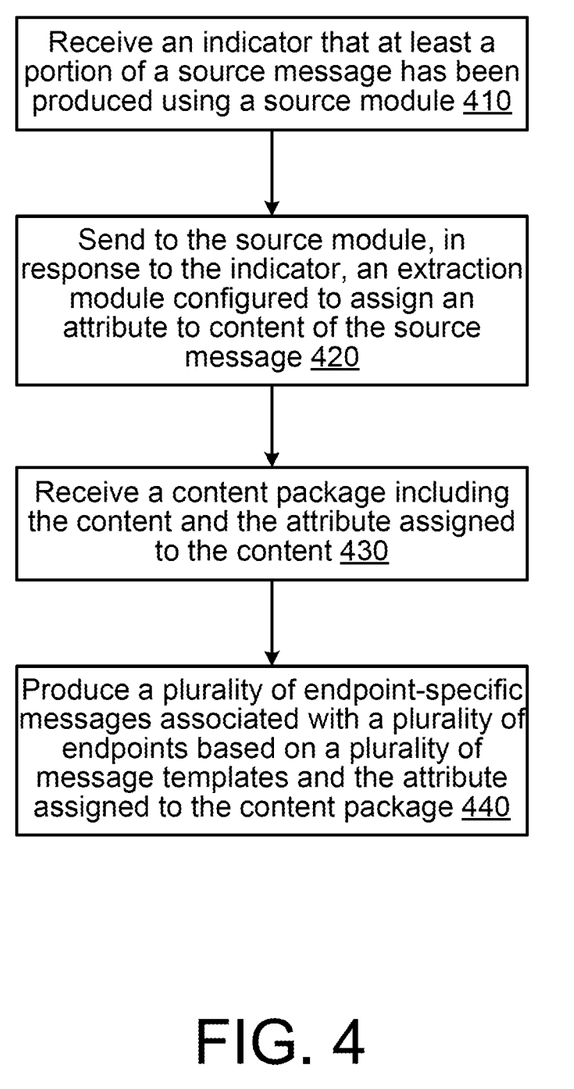
FIG. 4 is a flowchart that illustrates a method for defining endpoint-specific messages based on a source message, according to an implementation.

FIG. 4 is a flowchart that illustrates a method for defining endpoint-specific messages based on a source message, according to an implementation. In some implementations, at least some portions of the method shown in FIG. 4 can be performed at a formatter such as formatter 130 shown in FIG. 1.

As shown in FIG. 4, an indicator that at least a portion of a source message has been produced using a source module is received (block 410). In some implementations, the source message can be defined at a source module of a source device such as source module 110 shown in FIG. 1. The source module can be an application configured to define one or more messages, and the source message can be, for example, an e-mail message, a text message, and/or so forth.

In response to the indicator, an extraction module configured to assign an attribute to content of the source message is sent to the source module (block 420). In some implementations, the extraction module (e.g., extraction module 160 shown in FIG. 1) can be served to the source module from a formatter (e.g., formatter 130 shown in FIG. 1). In some implementations, the extraction module can be served to the source module, and can be configured to parse the content of the source message so that an attribute can be assigned to the content of the source message. In some implementations, the attribute value represents a contextual function of the content of the source message as, for example, a subject of the source message, a body of the source message, a salutation of the source message, and/or so forth.

A content package including the content and the attribute assigned to the content is received (block 430). In some implementations, the content package (e.g., content package 12 shown in FIG. 1) can be configured so that the content of the source message can be communicated in a standardized configuration (e.g., format) that can be processed by a formatter and used to define endpoint-specific messages.

A plurality of endpoint-specific messages associated with a plurality of endpoints are produced based on a plurality of message templates and the attribute assigned to the content package (block 440). In some implementations, the endpoints can include, for example, devices configured to process one or more endpoint-specific messages such as a cell phone, personal computer, the tablet computing device, and/or so forth. In some implementations, one or more of the message templates can be associated with an endpoint and can include data that can be used to define a message specific for the endpoint.

Figure 5:
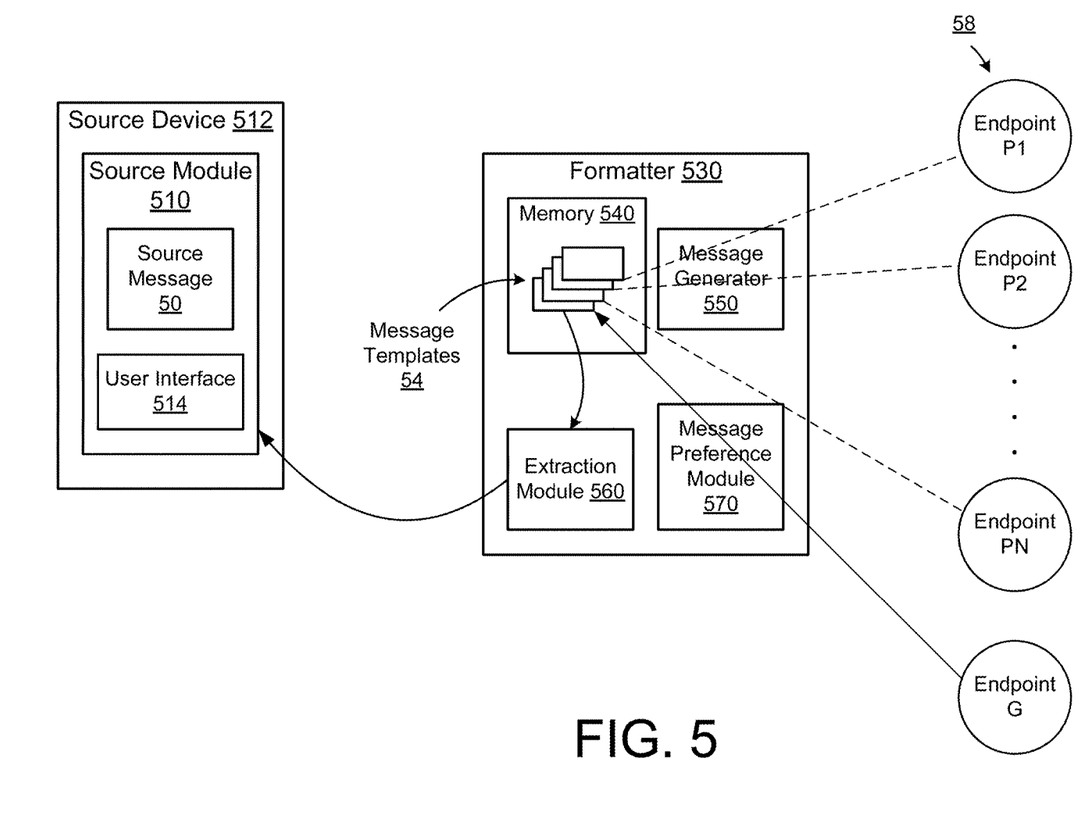
FIG. 5 is a diagram that illustrates another formatter configured to define endpoint-specific messages for endpoints, according to an implementation.

FIG. 5 is a diagram that illustrates another formatter 530 configured to define endpoint-specific messages for endpoints 58, according to an implementation. The formatter 530 is configured to define endpoint-specific messages (not shown) based on a source message 50 defined at a source module 510 of a source device 512. The endpoints 58 include endpoint PI through PN and endpoint G. The formatter 530 includes a message generator 550 configured to define each of the endpoint-specific messages based on a combination of a content package (not shown) received from the source module 510 and one or more message templates 54 stored in a memory 540. The message templates 54 are message templates that can be used by the message generator 550 of the formatter 530 to define endpoint-specific messages with an endpoint-specific format. In FIG. 5, the relationships between the message templates and the endpoints 58 are illustrated by dashed lines between the message templates 54 and the endpoints 58.

In this implementation, a message template associated with endpoint G (which can be a specific endpoint type different from the endpoint types associated with endpoints PI through PN) is sent to the formatter 530 and stored in the memory 540 with the message templates 54. In other words, the message template associated with endpoint G is added to the message templates 54. Accordingly, an endpoint-specific message, which could not previously be sent to endpoint G, can be defined for and sent to endpoint G based on the message template associated with endpoint G. Thus, the formatter 530 can be used to distribute endpoint-specific messages (based on the source message 50) to additional endpoints with different messaging compatibilities based on message templates being added to the message templates 54 stored in the memory 540.

The addition of the message template associated with endpoint G is communicated to the source module 510 via the extraction module 560. Specifically, when the extraction module 560 is received (e.g., in response to being requested) at the source module 510 the option of sending an endpoint-specific message to endpoint G is presented (e.g., presented in a menu). In some implementations, the extraction module 560 can be served to the source module 510 in response to the source message 50 being drafted (e.g., drafting being initiated, drafting being completed) and/or triggered (e.g., prepared) for sending (e.g., in response to a send button being actuated).

Figure 6:
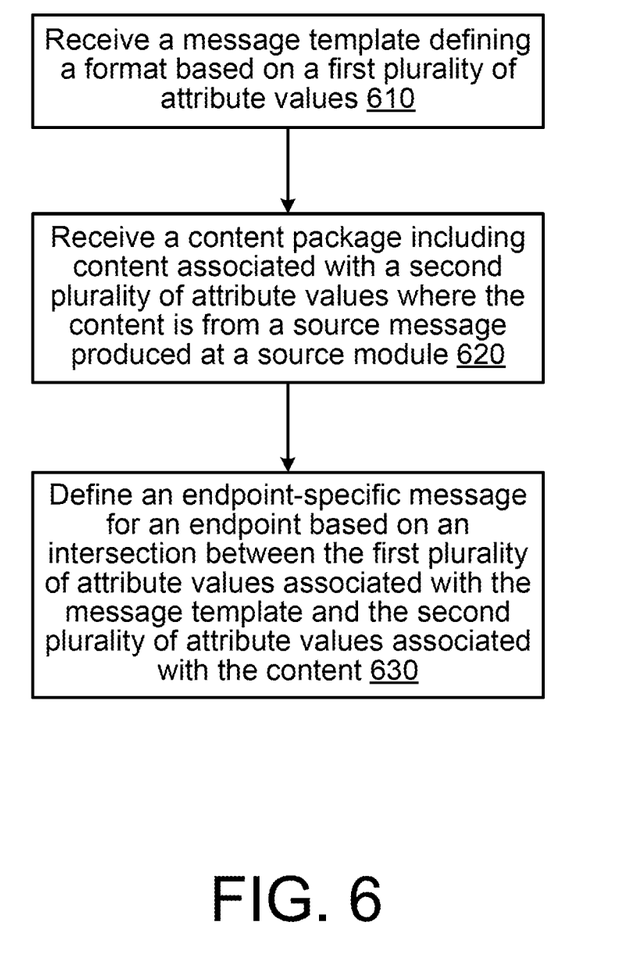
FIG. 6 is a flowchart that illustrates a method for using a message template to define an endpoint-specific message, according to an implementation.

FIG. 6 is a flowchart that illustrates a method for using a message template to define an endpoint-specific message, according to an implementation. The flowchart shown in FIG. 6 can be performed at least in part by a formatter (e.g., the formatter 130 shown in FIG. 1, the formatter 530 shown in FIG. 5).

As shown in FIG. 6, a message template defining a format based on a first plurality of attribute values is received (block 610). In some implementations, the message template can be received at a message generator (e.g., message generator 150 shown in FIG. 1). In some implementations, the message template can include an instruction related to handling of content related to one or more of the plurality of attribute values. In some implementations, message template can be received in response to request, and/or can be stored at (or accessed from) a formatter.

A content package including content associated with a second plurality of attribute values is received where the content is from a source message produced at a source module (block 620). In some implementations, the content package can be defined using an extraction module (e.g., extraction module 160 shown in FIG. 1). In some implementations, content can be parsed from the source message and associated with one or more of the attribute values from the second plurality of attribute values.

An endpoint-specific message is defined for an endpoint based on an intersection between the first plurality of attribute values associated with the message template and the second plurality of attribute values associated with the content (block 630). In some implementations, the endpoint-specific message can be defined by a message generator (e.g., message generator 150 shown in FIG. 1). In some implementations, multiple endpoint specific messages can be defined based on a single content package associated with a single source message.

Figure 7:
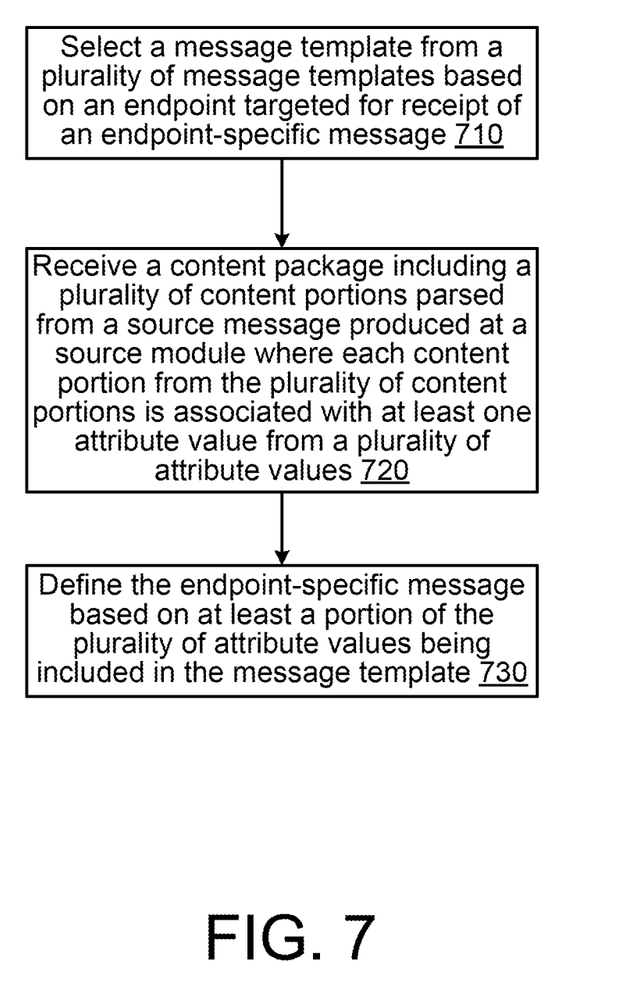
FIG. 7 is a flowchart that illustrates another method for using a message template, according to an implementation.

FIG. 7 is a flowchart that illustrates another method for using a message template, according to an implementation. The flowchart shown in FIG. 7 can be performed at least in part by a formatter (e.g., the formatter 130 shown in FIG. 1, the formatter 530 shown in FIG. 5).

As shown in FIG. 7, a message template is selected from a plurality of message templates based on an endpoint targeted for receipt of an endpoint-specific message (block 710). In some implementations, the plurality of message templates can be stored at a formatter. In some implementations, the endpoint can be targeted for receipt of the endpoint-specific message in a message preference associated with a user account.

A content package including a plurality of content portions parsed from a source message produced at a source module is received (block 720). In some implementations, each content portion from the plurality of content portions is associated with at least one attribute value from a plurality of attribute values.

The endpoint-specific message is defined based on at least a portion of the plurality of attribute values being included in the message template (block 730). In some implementations, only the content portions that are associated with attribute values included in the message template are included in the endpoint-specific message. In such implementations, content portions that are associated with attribute values that are excluded from the message template may not be included in the endpoint-specific message.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (e.g., a computer-readable medium, a tangible computer-readable medium) or in a propagated signal, for processing by, or to control the operation of, data processing apparatus, e.g., a programmable processor, a computer, or multiple computers. In some implementations, a tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), light emitting diode (LED) display, or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
    extracting a plurality of content portions from a source message;
    assigning the extracted plurality of content portions to a plurality of attribute values in a content package, wherein the content package is arranged differently than the source message;
    generating, from the content package, a first message for sending to a first device in a first message format based on a first message template and extracted first content portions of the extracted plurality of content portions;
    generating, from the content package, a second message for sending to a second device in a second message format different than the first message format based on a second message template and extracted second content portions of the extracted plurality of content portions,
    wherein the first message omits at least one of the extracted first content portions based on the first message template and the second message omits at least one of the extracted second content portions based on the second message template; and
    sending the first message to the first device and the second message to the second device.

2. The method of claim 1, wherein the first message is an email message and the second message is a text message, wherein the second message format is based on a text messaging application.

3. The method of claim 2, wherein generating the second message comprises:
    determining that content generated based on the extracted second content portions exceeds a threshold limit on the content;
    generating, based on determining that the content exceeds the threshold limit, multiple text messages based on the second message template and extracted second content portions, wherein a generated text message of the multiple text messages comprises a truncated content portion of the content exceeding the threshold limit.

4. The method of claim 1, wherein the source message is an update notification associated with a document that is updated in a document program, and wherein the first message is generated in response to the document being updated, the method further comprising:
identifying the first device and the second device based on endpoint information stored in a user account associated with updating the document.

5. The method of claim 1, the method further comprising:
selecting the first message template for the first message based on an endpoint type associated with the first device.

6. The method of claim 5, wherein the endpoint type is a type of application associated with an application designated to process the first message.

7. The method of claim 5, wherein the endpoint type is based on a type of the first device.

8. The method of claim 1, wherein generating the content package comprises:
parsing content of the source message;
extracting the extracted first and second content portions from the source message;
assigning the extracted first content portions to first attribute values of the plurality of attribute values; and
assigning the extracted second content portions to second attribute values of the plurality of attribute values.

9. The method of claim 1, wherein the plurality of attribute values identify the respective extracted plurality of content portions as a subject, a body portion, a signature block, an image, an audio recording, an advertisement, a link, an attachment, a network address, or a priority.

10. A system, comprising:
one or more computing devices; and
a memory including instructions stored thereon that, when executed by the one or more computing devices, cause the one or more computing devices to perform operations comprising:
extracting a plurality of content portions from a source message;
assigning the extracted plurality of content portions to a plurality of attribute values in a content package, wherein the content package is arranged differently than the source message;
generating, from the content package, a first message for sending to a first device in a first message format based on a first message template and extracted first content portions of the extracted plurality of content portions;
generating, from the content package, a second message for sending to a second device in a second message format different than the first message format based on a second message template and extracted second content portions of the extracted plurality of content portions,
wherein the first message omits at least one of the extracted first content portions based on the first message template and the second message omits at least one of the extracted second content portions based on the second message template; and
sending the first message to the first device and the second message to the second device.

11. The system of claim 10, wherein the first message is an email message and the second message is a text message, wherein the second message format is based on a text messaging application.

12. The system of claim 11, wherein generating the second message comprises:
determining that content generated based on the extracted second content portions exceeds a threshold limit on the content;
generating, based on determining that the content exceeds the threshold limit, multiple text messages based on the second message template and extracted second content portions, wherein a generated text message of the multiple text messages comprises a truncated content portion of the content exceeding the threshold limit.

13. The system of claim 10, wherein the source message is an update notification associated with a document that is updated in a document program, and wherein the first message is generated in response to the document being updated, the operations further comprising:
identifying the first device and the second device based on endpoint information stored in a user account associated with updating the document.

14. The system of claim 10, the operations further comprising:
selecting the first message template for the first message based on an endpoint type associated with the first device.

15. The system of claim 14, wherein the endpoint type is a type of application associated with an application designated to process the first message.

16. The system of claim 14, wherein the endpoint type is based on a type of the first device.

17. The system of claim 10, wherein generating the content package comprises:
parsing content of the source message;
extracting the extracted first and second content portions from the source message;
assigning the extracted first content portions to first attribute values of the plurality of attribute values; and
assigning the extracted second content portions to second attribute values of the plurality of attribute values.

18. The system of claim 10, wherein the plurality of attribute values identify the respective extracted plurality of content portions as a subject, a body portion, a signature block, an image, an audio recording, an advertisement, a link, an attachment, a network address, or a priority.

19. A non-transitory computer-readable storage medium comprising instructions that, when executed, facilitate the steps of:
extracting a plurality of content portions from a source message;
assigning the extracted plurality of content portions to a plurality of attribute values in a content package, wherein the content package is arranged differently than the source message;
generating, from the content package, an email message for sending to a first device based on a first message template and extracted first content portions of the extracted plurality of content portions;
generating, from the content package, a text message for sending to a second device based on a second message template and extracted second content portions of the extracted plurality of content portions, the text message being formatted based on a text messaging application, wherein the email message omits at least one of the extracted first content portions based on the first message template and the text message omits at least one of the extracted second content portions based on the second message template; and sending the email message to the first device and the text message to the second device.

20. The non-transitory computer-readable storage medium of claim 19, wherein generating the text message comprises:
   determining that content generated based on the extracted second content portions exceeds a threshold limit on the content;
   generating, based on determining that the content exceeds the threshold limit, multiple text messages based on the second message template and extracted second content portions, wherein a generated text message of the multiple text messages comprises a truncated content portion of the content exceeding the threshold limit.

\* \* \* \* \*